(12) United States Patent
Gettle

(10) Patent No.: US 10,124,917 B2
(45) Date of Patent: Nov. 13, 2018

(54) SHIELD ASSEMBLY FOR PROTECTING SPACECRAFT

(71) Applicant: Hybrid Components & Coatings LLC, Largo, FL (US)

(72) Inventor: Guy Leath Gettle, Alamo, CA (US)

( * ) Notice: Subject to any disclaimer, the term of this patent is extended or adjusted under 35 U.S.C. 154(b) by 318 days.

(21) Appl. No.: 14/895,079

(22) PCT Filed: Jun. 4, 2014

(86) PCT No.: PCT/US2014/000144
§ 371 (c)(1),
(2) Date: Dec. 1, 2015

(87) PCT Pub. No.: WO2014/197009
PCT Pub. Date: Dec. 11, 2014

(65) Prior Publication Data
US 2016/0107770 A1 Apr. 21, 2016

Related U.S. Application Data

(60) Provisional application No. 61/956,359, filed on Jun. 5, 2013.

(51) Int. Cl.
| | | |
|---|---|---|
| B32B 5/18 | (2006.01) | |
| B64G 1/56 | (2006.01) | |
| F41H 5/02 | (2006.01) | |
| F41H 5/04 | (2006.01) | |
| F42B 15/34 | (2006.01) | |

(52) U.S. Cl.
CPC ............. B64G 1/56 (2013.01); F41H 5/023 (2013.01); F41H 5/045 (2013.01); F42B 15/34 (2013.01)

(58) Field of Classification Search
CPC .... B64G 1/56; B64G 1/52; B64G 1/54; F41H 5/023; F41H 5/045; F42B 15/34
USPC .... 428/613, 301.1, 643, 644, 645, 647, 650, 428/651, 654–655, 660, 603–604, 548, 428/615; 89/36.02, 36.01, 36.11; 244/171.7, 123.12
See application file for complete search history.

(56) References Cited

U.S. PATENT DOCUMENTS

| | | | | |
|---|---|---|---|---|
| 4,925,134 A * | 5/1990 | Keller | ....... | B64C 1/38 244/117 A |
| 6,298,765 B1 * | 10/2001 | Dvorak | ....... | B64G 1/56 89/36.02 |
| 7,465,500 B2 * | 12/2008 | Yang | ....... | B64G 1/56 109/49.5 |

OTHER PUBLICATIONS

Ryan et al., Honeycomb vs. foam:Evaluating potential upgrades to ISS module shielding, (2010), Acta Astronautica, 67, pp. 818- 825. (Year: 2010).*

* cited by examiner

*Primary Examiner* — David Sample
*Assistant Examiner* — Elizabeth Collister
(74) *Attorney, Agent, or Firm* — Ramberg IP, LLC; Jeffrey R. Ramberg

(57) ABSTRACT

A shield assembly for protection of vehicles traveling in space consisting of at least five layers that would replace the thin metal impact shield in Whipple shields fabricated using the current art that employs only a single metal. All of the layers in the present invention are metallic. At least three different metals must be used in this invention. FIG. 1 shows the basic embodiment of the transparent blast protection assembly. The shield assembly (10) comprises a first metal layer (20), a second metal layer (30), a third metal foam layer (40), a fourth metal layer (50), and a fifth metal layer (60). At least one spacer component (70) is used to create and maintain a space between the structure requiring impact protection (80) and the shield assembly.

8 Claims, 1 Drawing Sheet

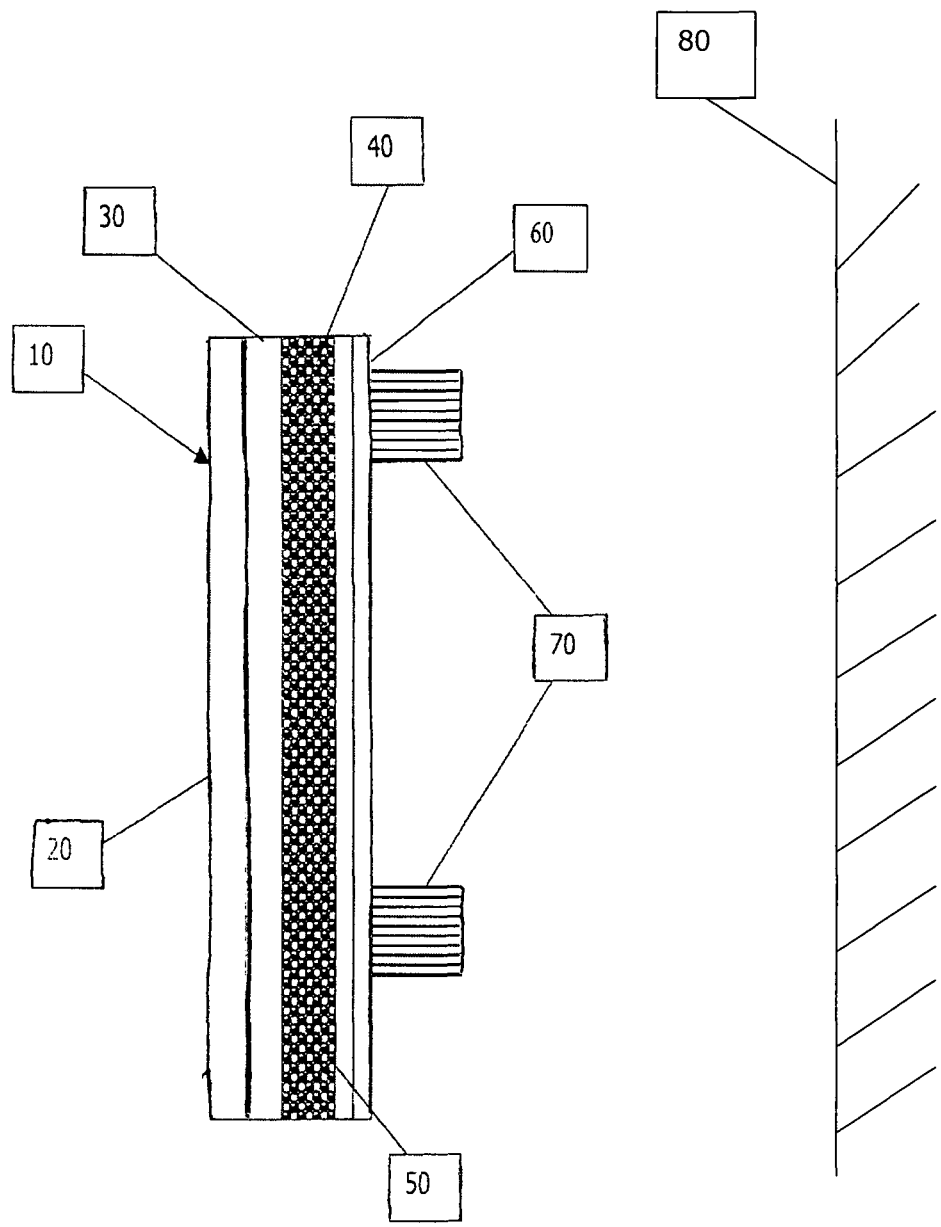

SHIELD ASSEMBLY FOR PROTECTING SPACECRAFT

TECHNICAL FIELD

This invention relates to assemblies that can protect structures against impact by dense objects traveling at high velocities, and specifically to shield assemblies for protection of vehicles traveling in space.

BACKGROUND ART

Vehicles traveling above the atmosphere are frequently impacted by micrometeorites, which often collide at relative velocities as great as 30 kilometers per second. Fortunately, most micrometeorites have masses considerably less than 1 gram and comprise minerals such as silicates that are characteristically low in density. The combination of low density and hypersonic velocities render them ideal for destruction by structures generally termed Whipple shields.

Frederick Whipple, an astronomer, proposed a concept in the 1940s comprising a thin metal sheet supported in a manner such that a gap would be maintained between the thin shield and structure requiring protection. Micrometeorites impacting the thin metal shield would melt or vaporize, as would the part of the shield in contact with the projectile. Molten material and vaporized debris would then be unable to puncture the structure beyond the gap. Numerous tests in the 1960s proved the efficacy of the concept. As a result, Whipple shields were used to protect Apollo spacecraft and the International Space Station.

Conventional Whipple shields require that the mass of the thin shield be small so that the entire portion interacting with the projectile will melt or vaporize, and thereby be incapable of piercing the structure requiring protection once it is dislodged from the rest of the shield. Such a thin metal layer will be penetrated easily by larger and denser objects. This unfortunate situation results from the hydrodynamic nature of projectile impacts at velocities much greater than 2 kilometers per second. Shear stresses generated in shields by impact at hypersonic velocities greatly exceed the mechanical strength of any material.

Spacecraft are not only at risk from meteorite impacts. Vehicles in orbit around the Earth may collide with one of many thousands of man-made objects. Such objects may be small items such as tools, gloves, or bolts. Entire assemblies also pose a hazard, such as shrouds, rocket motor casings and empty metal tanks. Relative velocities between orbiting debris and spacecraft may be considerably lower than 30 kilometers per second, but the greater density and larger mass of such objects would readily penetrate any Whipple shield made with the present art.

Terrestrial vehicles and structures typically employ heavy armor assemblies to resist penetration by dense, supersonic projectiles. Armors made with the present art generally use thick, dense metal plates and strong ceramic facings to erode and break up dense projectiles. Although bulky and heavy, this kind of armor assembly is generally effective against dense projectiles impacting at velocities less than 10 kilometers per second.

Against superplastic projectiles formed by explosive devices, a different kind of assembly generally termed "reactive armor" is often employed. Reactive armor assemblies comprise two thick, metal plates sandwiching an explosive. Reactive armor assemblies are placed at an angle to the anticipated direction of projectile approach. Penetration by a superplastic metal penetrator, typically called a shaped charge jet, detonates the explosive. Detonation causes the two metal plates to move in opposite directions, thereby disrupting the shaped charge jet and rendering it incapable of piercing armor behind the assembly.

Thick armor and reactive armor assemblies are far too heavy for use aboard spacecraft. Heavy armor serves no other useful purpose, so the rocket size required to launch the extra mass of terrestrial vehicle armor would impose an expensive burden. Such a burden would displace weight and space that would otherwise be available for fuel, provisions and scientific equipment.

Improved means of protecting spacecraft against impact by dense objects moving at high velocity are highly desirable. Many advantages would accrue if such protection means can be provided with much less mass and bulk compared with armor made using the present art.

DISCLOSURE OF THE INVENTION

In view of the inability to stop dense projectiles moving at velocities greater than 10 kilometers per second with Whipple shields made using the current art, novel means are required. The present invention accordingly offers a means for substantially reducing weight and assembly thickness while stopping dense projectiles having masses as great as 1 kilogram. More massive objects are detectable at long distances, thus enabling spacecraft to maneuver away before impacts can occur.

As discussed in greater detail elsewhere, the present invention contemplates an assembly consisting of at least five layers that would replace the thin metal impact shield in Whipple shields fabricated using the current art that employs only a single metal. All of the layers in the present invention are metallic. At least three different metals must be used in this invention.

The first component is a thin, planar exterior metal layer upon which a meteorite or man-made object first impacts. Melting temperature of this first layer is less than 700 degrees Celsius.

The first metal layer is backed by a parallel second metal layer in contact with the first layer such that a shock wave transmitting through the first layer can reflect at the interface. The second metal layer has a higher density than the first metal layer. An intervening layer of adhesive or other material that ensures intimate contact between the two metal layers may be used as long as its thickness is less than 1 millimeter. Melting temperature of the second metal layer, and intervening bonding layer if employed, must also be below 700 degrees Celsius.

The third layer comprises a metal foam. This metal foam layer has a density less than 60% of the same solid metal. Average pore size of the metal foam is at least 0.5 millimeter. Thickness of the third layer is at least 3 millimeters. The metal foam is contiguous with the second and fourth layers and generally parallel thereto.

The fourth layer is a thin sheet of dense metal. The density of the fourth layer exceeds 8 grams per cubic centimeter. An adhesive or other bond layer may be used to join the metal foam and fourth layer if less than one millimeter in thickness.

The fifth layer is a metal having a melting temperature less than 700 degrees Celsius, and having a density exceeding 7 grams per cubic centimeter. The fifth layer must be affixed to the fourth layer so that shock waves transmitting the fourth layer can propagate into the fifth layer over a wide area. Thickness of the fifth layer is less than 5 millimeters.

As with conventional Whipple shields, a space or gap must be provided between the present invention and structure requiring protection against hypervelocity impacts. Thickness of this space or gap must be on the order of at least four centimeters, which can be created and maintained by numerous alternative components.

BRIEF DESCRIPTION OF DRAWINGS

FIG. 1 shows the basic embodiment of the transparent blast protection assembly.

OBJECTS AND ADVANTAGES

Accordingly and in view of the above summary, the invention offers a number of objects and advantages set forth as follows:

(a) to prevent penetration of spacecraft by dense objects impacting at high relative velocities;

(b) to reduce weight and thickness of shields capable of protecting spacecraft from hypervelocity impacts by dense objects; and (c) to enable adaptation of the Whipple shield concept to protect against dense objects impacting at high relative velocities. One skilled in the art should recognize, however, that not every embodiment of the invention is required to provide each of these objects/advantages.

MODES FOR OPERATING THE INVENTION

The drawing accordingly depicts a number of embodiments according to the present invention. The embodiments are summarized below. A more detailed description of the respective FIGURES follows.

FIG. 1 shows the basic embodiment of the transparent blast protection assembly. The shield assembly 10 comprises a first metal layer 20, a second metal layer 30, a third metal foam layer 40, a fourth metal layer 50, and a fifth metal layer 60. At least one spacer component 70 is used to create and maintain a space between the structure requiring impact protection 80 and the shield assembly.

Additional layers may optionally be employed to enhance impact protection. One such alternative embodiment is to place another metal layer between the second metal layer and the metal foam layer, the added metal layer having a density exceeding 8 grams per cubic centimeter, and a melting temperature at atmospheric pressure that is less than 1100 degrees Celsius. This layer may be flat or alternatively may be corrugated. Another alternative embodiment is to add a metal foam layer between the fifth metal and space between the shield and structure requiring impact protection. This additional metal foam layer would comprise a metal having a solid density greater than 7 grams per cubic centimeter and melting temperature less than 600 degrees Celsius.

ADVANTAGES

The invention offers numerous alternatives for a person skilled in the art to design assemblies and products offering protection against impacts from dense hypervelocity objects not achievable through existing means and methods. Through the present invention one skilled in the art can add resistance to projectile penetration without regard to their density.

This advance in capability would make protection against massive object impacts possible in many applications where weight and space limitations for spacecraft would render such protection impossible through the current art. The invention makes possible capabilities now that are not possible currently using existing materials, and can utilize new materials yet to be developed.

Operation

The shield assembly, such as that shown in FIG. 1, becomes operable when a dense object impinges upon the first metal layer at a relative velocity between the dense object and the spacecraft greater than roughly 5 kilometers per second. Such an impact causes melting of the first metal layer, which is the point when operation of the invention begins. The first metal layer comprises the outer surface.

The metal of the first layer must melt at temperatures below 700 degrees Celsius so that melting is assured upon impact by the dense object. Aluminum, lithium, magnesium and zinc are suitable materials for this layer.

Melting occurs because of the shock wave transmitting ahead of the dense object, or by impact of the object itself, if impact velocity exceeds the shock wave propagation velocity in the first metal layer. High pressures generate correspondingly high thermodynamic temperatures in the first metal layer far above the melting temperature.

When pressure is relieved by the shock wave reflecting at the boundary between the first and second metal layers, the molten first metal layer is ejected in the direction of origin of the projectile and away from the shield assembly. Impact also generates high pressures and stresses within the dense object. As with the first metal layer, high pressure increases thermodynamic temperature within the dense impacting object.

Shock waves arising from projectile impact propagate ahead of the penetrating object into the second metal layer, or direct impact by the penetrating object itself, cause melting of this metal layer. As with the first metal layer, the metal in the second layer must melt at a temperature below 700 degrees Celsius. Additionally, the shock impedance of the second metal layer must be greater than that of the first metal layer. This is so that a strong compressive shock wave will be generated at the interface, which is reflected back into the first layer. If the first layer is aluminum, then zinc and lead are suitable second metal layer materials. If either magnesium or lithium comprise the first metal layer, then aluminum is suitable as the second metal layer.

Shock impedance is defined as the mathematical product of density and shock wave propagation velocity. Metals suitable for the first and second metal layers are relatively compressible under hypervelocity impact pressures, which increases their densities. Shock pressures increase when the second layer has a higher impedance than the first layer. Substantially increasing the pressure in the first two metal layers is a desirable objective in the present invention. Vaporization of the second metal layer is desirable.

Proper operation of the present invention requires rapid melting of the first two metal layers upon impact by a dense object in the shield materials near the object. To ensure melting over a wide range of impact velocities and projectile densities, combined total thickness of the first two metal layers must be less than 10 millimeters regardless of the mass of impacting object that must be resisted.

The third layer is a metal foam. Pores in the metal foam must typically be macroscopic. Molten metal droplets from the first two metal layers are accelerated into the metal foam. Momentum transfer results, which causes a corresponding reduction in momentum from the impacting object. Additionally, the filaments of the metal foam are thin, enabling shock waves to quickly transit. This results in acceleration of the metal filaments at velocities typically exceeding 6 kilometers per second, or 6 millimeters per microsecond. Such accelerations result in significant momentum transfers substantially transverse to the direction of dense object motion.

This third metal foam layer is intended to melt upon impact by a dense object traveling at hypersonic velocities. Molten droplets from the metal foam impact and are decelerated by the remaining solid portions of the metal foam. The presence of voids in the foam serve as free surfaces with respect to shock waves transiting the first and second metal layers. This facilitates molten droplet formation from those layers as well as from the metal foam itself. These macroscopic free surfaces also encourage material from the dense impacting object to be expelled due to motion of the material within the dense object caused by impact pressure.

Aluminum foam is an acceptable material for this third layer. Lead and copper foams are also desirable options. Lead melts at a low temperature and under relatively low pressure. Because of lead's density, molten droplets accelerated to high velocities extract more momentum from the impacting dense object than can occur with lighter metal foams.

Although copper has a significantly higher melting temperature than lead or aluminum (1,083 degrees Celsius), it also is dense. Hypersonic impact from dense objects readily generates pressures sufficient to melt copper and copper foam. Presence of macroscopic pores in copper foam facilitate formation of molten copper droplets.

Because of the higher acoustic speed in copper, the impedance of copper and copper foams is higher than for lead and lead foam. Impact with copper and copper foam will further increase stresses within the dense projectile as it penetrates the shield assembly.

Thickness of the third metal foam layer is a significant choice. Foam thickness must be great enough for the molten metal droplets from the first and second layers, along with some metal from the metal foam itself, to be accelerated within the metal foam before the dense object can impinge upon the structure. Preferably this momentum transfer would occur before the dense object impinges upon the fourth metal layer. This will decelerate the dense object.

The fourth metal layer is in direct contact with the metal foam. This fourth metal layer is dense and has a shock impedance significantly greater than the impacting dense object. Dense object impact on the fourth metal layer produces very high pressures within both the dense object and the fourth metal layer. Because the dense object has been in continuous contact with increasingly dense material, shock pressures and thus material motion within the dense object have been sustained.

Acceptable options for the fourth metal layer include nickel, molybdenum, and tungsten. The fourth metal layer is intended to be thin in order to encourage compressive shock wave transmission into the fifth metal layer before the dense object penetrates entirely therethrough. In no cases should this layer be greater than five millimeters in thickness. Maximum pressure transmission into the fifth metal layer is an important design objective.

The fifth metal layer is intended to melt upon impact either by the dense impinging object or shock pressure waves transmitting through the fourth metal layer and across the interface with the fifth metal layer. To enhance momentum transfer from the dense object, the density of the fifth metal layer is preferably dense while possessing a low melting temperature.

Shock impedance of the fifth metal layer will be less than the impedance of the fourth metal layer. This will result in a reflected pressure wave from the interface that is lower than the shock pressure initially impinging on the fifth metal layer. This serves to reduce stresses within the fourth metal layer. Because of the small depth of the fourth metal layer, the shock pressure transiting will reflect as another strong compressive pressure wave into the third metal foam layer before the dense object can exit the shield assembly. This pressure wave will still be sufficient to melt metal foam material and accelerate the droplets toward the direction from which the dense object originates.

Molten droplets from the fifth metal layer are intended to spray over a wide area across the gap between it and the structure being protected against dense object impact. By spraying over a wide area, the local stresses within the protected structure are kept below failure limits. Failure limits of concern include tensile, shear and compressive stresses.

Pressures within the dense impacting object induced by the shield assembly will be far in excess above the threshold values for complete melting. Partial vaporization of the dense object may also be induced by interaction with the shield assembly. To ensure complete melting of the dense impacting object, the depth of the gap or space is selected to allow return of the pressure within the entire dense object to be return to its original internal pressure. As an example, a spheroidal object with a diameter of roughly 2 centimeters traveling at 10 kilometers per hour, or 10 millimeters per microsecond, across a gap of 2 centimeters will allow the entire object to melt prior to impinging upon the structure behind the gap regardless of dense object composition or density.

Efficiency of the shield assembly, in terms of mass and thickness required to prevent penetration into a spacecraft, can be increased of the fourth and fifth metal layers are corrugated. Intimate contact between these metal layers must be maintained after corrugation.

Shock pressure waves reaching the fourth metal layer will reflect and be focused by the roughly parabolic corrugated surface. Additionally, transverse components of shock wave reflections from the fourth and fifth metal layers will traverse the impinging dense object at a faster velocity because of the increased pressure. When the dense object arrives in the gap behind the shield assembly, the greater pressure and particle velocity of dense object material will accelerate disintegration.

Importantly, corrugation of the fourth and fifth metal layers encourage formation of a wider angle of molten metal spray from the fifth metal layer. Rarefaction waves form at different times as the dense object penetrates the fourth and fifth metal layers that enhance formation of tension cracks within the dense object as well as accelerate ejection of surface material from the impactor.

The above describes basic embodiments of the shield assembly invention. Adding a second metal layer in front of the metal foam layer of the basic embodiment will further increase effectiveness if this new metal layer has a higher shock impedance than the first two metal layers. This optional layer must be less than 4 centimeters regardless of dense object size and average density.

Similarly, an optional second metal foam layer between the first foam metal layer of the basic embodiment and the second metal layer would be beneficial. This additional metal foam should be either lead or nickel. These have lower impedance than copper, but are dense. Molten and accelerated material from this optional foam layer would accelerate the lateral transfer of momentum, thus reducing local stresses in the following layers. The decision to employ the optional layer or layers must depend upon the mass and size of the dense object which must be destroyed along with considerations of acceptable weight and cost of the shield assembly.

Embodiments of the present invention may be used as shields added to existing spacecraft and structures. Alternatively, embodiments of the shield assembly may form integral portions of spacecraft, structures and other vehicles. In such cases, the layer on the side of the gap opposite the fifth metal layer would form part of a wall or barrier.

RAMIFICATIONS AND SCOPE

Accordingly, the reader will observe that assemblies made through this invention would offer substantial protection against dense objects striking spacecraft at very high velocities. Different embodiments of this invention make protection possible against a wide range of projectile sizes and shapes, both natural and manufactured.

Many other possibilities exist for a person skilled in the art to use the present invention to produce means of protection against dense projectiles impacting at velocities exceeding 5 kilometers per second other than those described and illustrated above. The above embodiments are not intended to limit the application of concepts described above.

Variations and modifications in addition to those described above are believed obvious from the description. Accordingly, the scope of the invention is defined only by the following appended claims that are further exemplary of the invention.

What is claimed is:
1. A shield assembly comprising:
    (a) a first metal layer having a melting temperature less than 700 degrees Celsius at atmospheric pressure,
    (b) a second metal layer contiguous with said first metal layer, the metal comprising said second metal layer having a density greater than the first metal layer and having a melting temperature less than 700 degrees Celsius at atmospheric pressure,
    (c) a third metal foam layer, said third metal foam layer being contiguous with the second metal layer and having a pore size typically greater than 0.5 millimeter and density less than 60% of the density of the same metal without porosity,
    (d) a fourth metal layer having a density exceeding 8 grams per cubic centimeter contiguous with the third metal foam layer,
    (e) a fifth metal layer, said fifth metal layer having a melting temperature less than 700 degrees Celsius at atmospheric pressure and a density exceeding 7 grams per cubic centimeter, and
    (f) at least one spacer, said spacer causing a space to be formed between the fifth metal layer and surface of an object being protected against penetration by an object impinging on the first metal layer, said space being at least 5 centimeters prior to impingement by an object on the first layer.

2. The shield assembly of claim 1, in which the second metal layer comprises a metal selected from the group consisting of zinc, lead and copper.

3. The shield assembly of claim 1, in which the third metal foam layer comprises a metal foam selected from the group consisting of aluminum, lead, and copper.

4. The shield assembly of claim 1, in which the fourth metal layer comprises molybdenum.

5. The shield assembly of claim 1, in which the fourth and fifth metal layers are corrugated.

6. The shield assembly of claim 1, in which at least one surface of the third metal foam layer is affixed to a contiguous surface using a material selected from the group comprising polyurethane resins, polyethylene, epoxy resins, and waxes.

7. The shield assembly of claim 1, in which a metal foam layer is inserted between the fifth metal layer and the gap between the fifth metal layer and surface being protected against impact by dense objects, said metal foam layer having a melting temperature at atmospheric pressure less than 700 degrees Celsius and having a thickness not exceeding 3 centimeters.

8. The shield assembly of claim 2, in which a metal layer is placed between the second metal layer and third metal foam layer, said metal layer having a density exceeding 8 grams per cubic centimeter and melting temperature at atmospheric pressure less than 1,100 degrees Celsius.

* * * * *